United States Patent
Elahmadi et al.

(10) Patent No.: US 8,139,958 B2
(45) Date of Patent: Mar. 20, 2012

(54) FREQUENCY-DOMAIN EQUALIZATION OF THE FIBER OPTIC CHANNEL

(76) Inventors: Salam Elahmadi, Dallas, TX (US);
Siraj Nour Elahmadi, Dallas, TX (US)

( * ) Notice: Subject to any disclaimer, the term of this patent is extended or adjusted under 35 U.S.C. 154(b) by 761 days.

(21) Appl. No.: 11/829,806

(22) Filed: Jul. 27, 2007

(65) Prior Publication Data
US 2009/0028576 A1    Jan. 29, 2009

(51) Int. Cl.
*H04B 10/06* (2006.01)
*H04B 10/00* (2006.01)
(52) U.S. Cl. .......................... 398/208; 29/159
(58) Field of Classification Search .............. 398/29, 398/147, 158, 159, 192, 193, 194, 208
See application file for complete search history.

(56) References Cited

U.S. PATENT DOCUMENTS

| | | | |
|---|---|---|---|
| 5,768,165 A * | 6/1998 | Palicot et al. | 708/300 |
| 7,769,305 B1 * | 8/2010 | Roberts et al. | 398/206 |
| 2004/0067064 A1 | 4/2004 | McNicol et al. | |
| 2004/0114939 A1 * | 6/2004 | Taylor | 398/152 |
| 2006/0078336 A1 | 4/2006 | McNicol et al. | |
| 2006/0140636 A1 * | 6/2006 | Marazzi et al. | 398/147 |
| 2007/0201574 A1 * | 8/2007 | Wu et al. | 375/261 |
| 2009/0220239 A1 * | 9/2009 | Armstrong et al. | 398/81 |

OTHER PUBLICATIONS

Oppenheim, Alan V. et al., Chapter 8 in Linear Convolution Using the Discrete Fourier Transform (book), 1989, 548-560.

* cited by examiner

*Primary Examiner* — Kenneth N Vanderpuye
*Assistant Examiner* — Daniel Dobson
(74) *Attorney, Agent, or Firm* — Krueger Iselin LLP

(57) ABSTRACT

Systems and methods for frequency-domain compensation in optical communication systems. In pre-equalization embodiments, the transmitter transforms the data stream into a frequency domain signal and applies a compensation filter before transforming it back into a pre-distorted time domain signal. As the pre-distorted time domain signal propagates through the optical channel, optical dispersion effects counter the pre-distortion, producing an equalized signal at the channel output. In post-equalization embodiments, the receiver transforms the received signal into a frequency domain signal and applies a compensation filter before transforming it back into an equalized time domain signal. Pre-equalization may prove less expensive due to the square-law characteristic of photodetectors employed by most receivers.

7 Claims, 5 Drawing Sheets

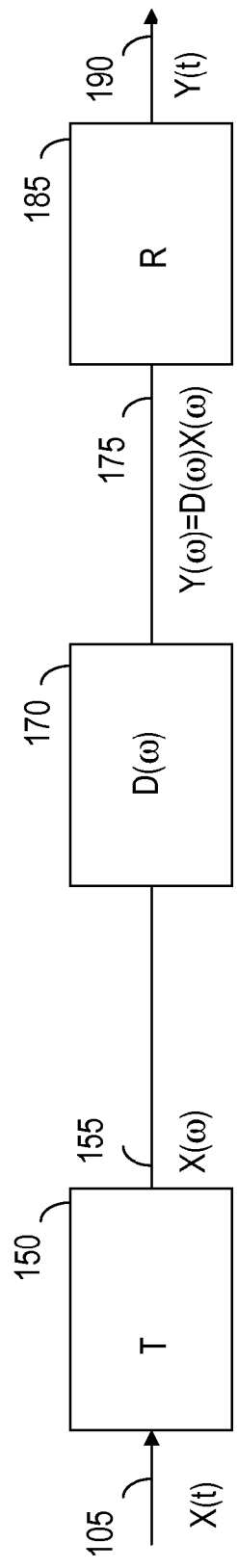
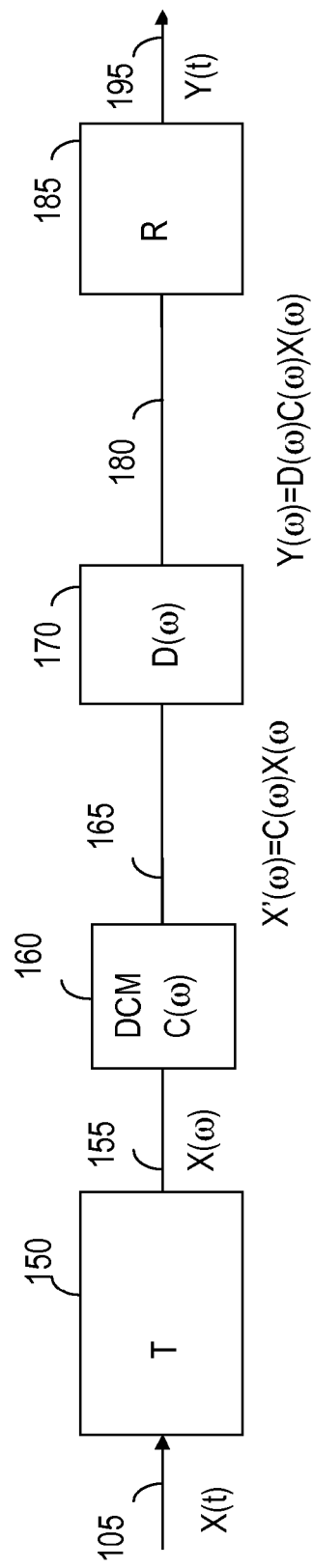

FREQUENCY-DOMAIN EQUALIZATION OF THE FIBER OPTIC CHANNEL

BACKGROUND

Optical communications systems transfer vast amounts of information over substantial distances using optical transmissions, typically through a fiber optic cable or similar optical medium. Transmissions through an optical medium degrade over distance in a different manner than electrical transmissions. Typically, dispersion of the optical signal is a substantial limitation on the length of the fiber optic channel before conversion to electrical signals is required for regeneration of the communicated data signal. Thus, for extreme distances, a series of transmitters and receivers (or transceivers) are linked by sections of fiber optic cable. The communications signal is converted back to electrical signals and regenerated, e.g., amplified, in electrical form.

Optical dispersion causes pulse broadening that impairs receiver performance, particularly when the transmitted optical signal is detected using square-law detection. If the pulses broaden too much, then the symbols used to encode the communications signals "overlap," producing intersymbol-interference.

A representation of a basic optical communications system is shown in prior art FIG. 1A. An input signal X(t) 105 to be sent over the optical channel is received at a transmitter 150 and modulated onto an optical beam 155. The optical beam 155 has a frequency domain representation X($\omega$) which is modified by dispersion response of the channel D($\omega$) 170. At the output of the channel, a receiver 185 receives a channel output beam 175 (having a frequency domain representation Y($\omega$)=D($\omega$)X($\omega$)). The ideal receiver 185 converts the output beam into a electrical receive signal 190. If the system were unaffected by dispersion (and other noise sources), the received signal Y(t) 190 would be recognized as the transmitted signal X(t) 105.

The most common method to address dispersion impairments in fiber optic transmission is the use of dispersion compensation modules (DCM). A DCM is a specially-designed optical filter that compensates the pulse-spreading effect, but is costly, bulky, and lossy.

An example of how a DCM may be used is shown in the optical communications system in prior art FIG. 1B. Somewhere along the signal path, one or more DCMs 160 act on the optical signal X($\omega$) 155 with a correction function C($\omega$) to create a corrected signal X'($\omega$) 165. The channel still creates dispersion in the optical beam as represented by dispersion block D($\omega$) 170. The correction function C($\omega$) for the DCM 160 is chosen so that C($\omega$) cancels out as much of the channel dispersion D($\omega$) 170 as possible. When the signal reaches the receiver 185, the output signal Y($\omega$) 180 now has the frequency representation given by Y($\omega$)=D($\omega$)C($\omega$)X($\omega$). If the correction function C($\omega$) has been chosen correctly, then the product D($\omega$)C($\omega$) is independent of $\omega$, making Y(t) simply an attenuated and time-shifted version of X(t). Such a compensation function can be difficult to achieve in the optical domain.

SUMMARY

There are disclosed herein various systems, transmitters, receivers, transceivers, and methods employing frequency-domain equalization of the fiber optic channel. In some embodiments, an electrical time domain signal is converted to the frequency domain, such as by Fourier transform and then the frequency domain signal is acted up by a correction function, such as by complex multiplication, to form a corrected frequency domain signal. The corrected frequency domain signal is then converted back to the time domain before being transmitted over the optical communications channel. In other embodiments, an optical receive signal is converted to an electrical receive signal and transformed into the frequency domain. A frequency domain filter is applied to compensate for dispersion effects. Thereafter the signal may be converted back into the time domain and demodulated.

BRIEF DESCRIPTION OF THE DRAWINGS

A better understanding of the various disclosed embodiments can be obtained when the following detailed description is considered in conjunction with the following drawings, in which:

FIG. 1A is a block diagram of a prior art optical communications system;

FIG. 1B is a block diagram of a prior art optical communications system with a dispersion correction module;

Figure 2:
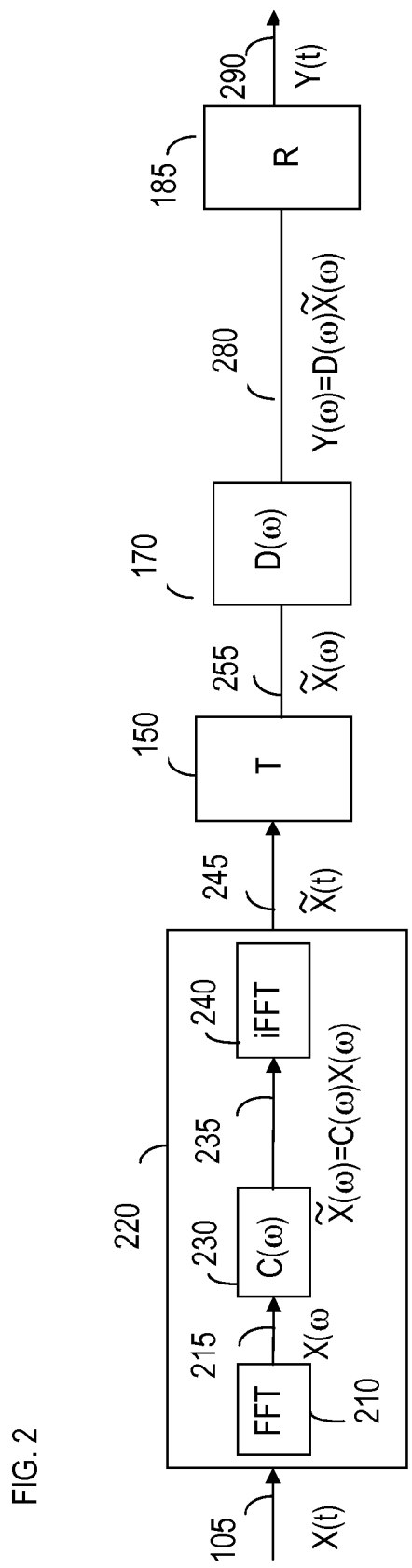
FIG. 2 is a block diagram of an optical communications system according to various embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

DETAILED DESCRIPTION

As used herein, dispersion is a general term including the group velocity dispersion, chromatic dispersion, and other similar phenomena that creates a nonlinear, frequency-dependent phase distortion. Described herein are various invention embodiments that counter dispersion effects in the frequency domain. The dispersion compensation may be implemented at the transmitter (pre-equalization), at the receiver (post-equalization), or at a transceiver (pre- and/or post-equalization). Embodiments of the present invention may eliminate the need for DCMs in ultra long-haul systems, those with reach >1000 km. This simplifies the network architecture and results in significant cost saving. Many embodiments of the present invention can be implemented in an integrated circuit.

Ignoring nonlinear effects, a signal that has traveled a distance z in an optical fiber or other optical channel is mathematically described by equation (1), where A(0,w) is the Fourier transform of the transmitted signal A(0,t) (for time t, launched at z=0) and $\beta_2$ is the group velocity dispersion (GVD) parameter of the optical channel:

$$A(z, t) = \frac{1}{2\pi} \int_{-\infty}^{\infty} \tilde{A}(0, \omega) \exp\left(\frac{i}{2}\beta_2 \omega^2 z - i\omega t\right) d\omega \quad (1)$$

In the frequency domain, equation (1) becomes $$A(z,\omega) = A(0,\omega) H(z,\omega), \quad (2)$$

where the fiber channel transfer function H(z,w) is $$H(z, \omega) = \exp\left(\frac{i}{2}\beta_2 \omega^2 z\right). \quad (3)$$

The transmitted signal can be recovered by inverse filtering, i.e., $$A(0,\omega) = A(z,\omega) H^{-1}(z,\omega), \quad (4)$$

where the inverse filter transfer function $H^{-1}(z,w)$ is $$H^{-1}(z, \omega) = \exp\left(-\frac{i}{2}\beta_2 \omega^2 z\right). \quad (5)$$

Note that depending on the specific model used, the GVD parameter $\beta_2$ may be a constant or a function of frequency or other variable.

Determining the GVD parameter $\beta_2$, and thus the filter transfer function, may be performed as is known in the art. One method of determining the GVD parameter $\beta_2$ would be to transmit a training signal over the optical channel and calculate the filter transfer function based on the received version of the training signal. The GVD parameter $\beta_2$ may be determined at the physical setup of the optical channel and/or the electrical setup of the optical channel. The GVD parameter $\beta_2$ may also be re-determined periodically or before a given transmission. Because the GVD parameter is expected to change very slowly or not at all, it should be unnecessary to make frequent measurements or adjustments to account for changes in this parameter.

FIG. 2 shows a generalized block diagram of an optical communications system in accordance with some embodiments of the present invention. The input signal X(t) 105 is received by a frequency domain equalization module 220. In the frequency domain equalization module 220, a frequency domain transform module, 210 accepts the input signal X(t) 105 and transforms the input signal into the frequency domain as X(ω) 215. The frequency domain transform module 210 may be implemented as a fast Fourier transform (FFT) module, though other digital Fourier transform implementations are know and may be used. The transform module 210 operates on complex-valued data blocks of at least length N+L−1, where N is the block size and L is the length of the inverse or correction filter transfer function. At the input to the transform module 210, N real (for single phase signaling) or complex (for in-phase and quadrature phase signaling) data symbols are padded with at least L−1 zeros, resulting in at least an N+L−1 point frequency domain signal X(ω) 215.

The frequency domain signal X(ω) 215 is acted upon by a frequency domain correction filter C(ω) 230, resulting in an equalized signal $\tilde{X}(\omega)$ 235. In the frequency domain, this filtering operation consists of multiplying each frequency coefficient by a corresponding filter coefficient. A time domain transform module, shown here including an inverse FFT (iFFT) module, 240 receives the equalized signal $\tilde{X}(\omega)$ 235 and transforms it to the time domain. The time domain transform module 240 produces blocks containing at least N+L−1 complex valued time samples. The last L−1 samples of each block overlap with the first L−1 samples of the subsequent block. Thus, the equalization module 220 includes an overlap-and-add unit that adds each of the last L−1 samples of each block with a corresponding one of the first L−1 samples of a subsequent block, thereby producing an equalized time domain signal $\tilde{X}(t)$ 245 that is pre-corrected for the effects of dispersion during the optical transmission. As an alternative to the overlap-and-add approach, the frequency transform may be applied to N-sample input blocks that overlap by L−1 samples, and the last L−1 samples from each output block may be discarded. The resulting equalized time domain signal 245 will be the same.

The equalized time domain signal $\tilde{X}(t)$ 245 is then sent over the optical channel by the transmitter 150. Transmitter 150 includes a two-dimensional (I&Q) optical modulator, sometimes called an I&Q electrical-to-optical converter, or "I&Q E/O". Ideally, the spectrum of the optical signal 255 matches the equalized signal $\tilde{X}'(\omega)$ 235. As the signal travels along the optical channel, it is subject to dispersion, shown here as D(ω) 170. At the input of the receiver 185, the received signal is now Y(ω)=D(ω)$\tilde{X}'(\omega)$ 280. In the time domain, the received signal Y(t) 290 should ideally be a time-delayed version of the input signal X(t), assuming that the pre-equalization in the frequency domain using correction signal C(ω) 230 properly corrects for the dispersion.

Figure 3:
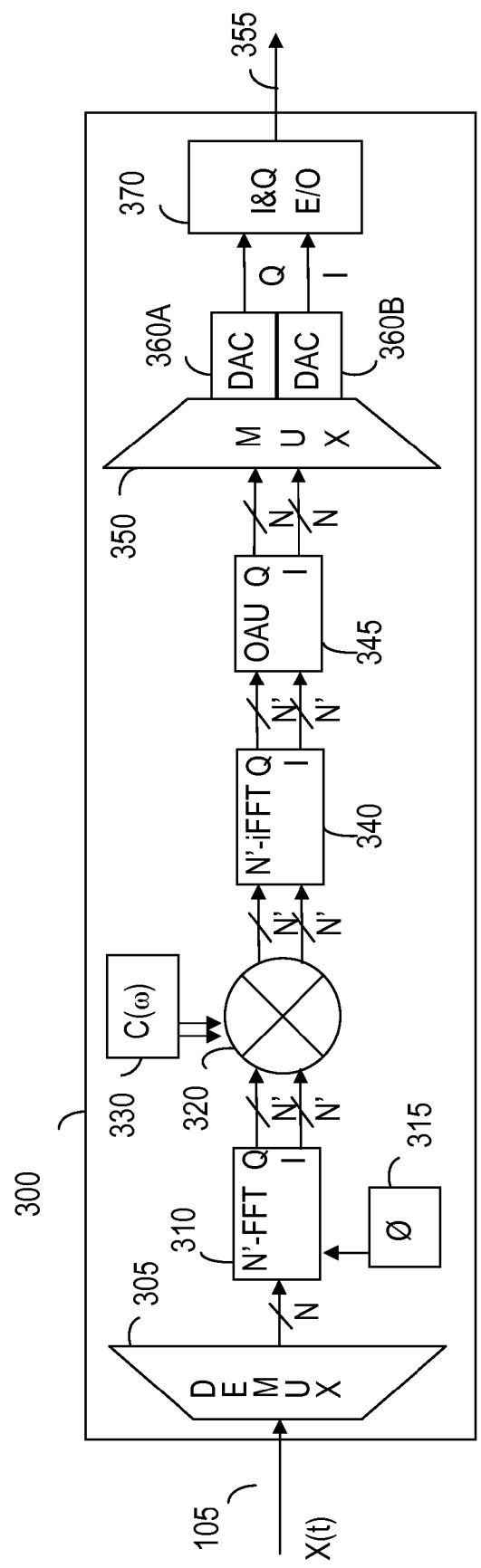
FIG. 3 is a block diagram of a transmitter according to various embodiments of the present invention.

FIG. 3 provides additional detail regarding some transmitter module implementations. A transmitter 300 receives the input signal X(t) 105. In the example of FIG. 3, the input signal X(t) 105 is a serial digital data signal. The serial input signal X(t) 105 is parallelized by a demultiplexer 305 into N-sample blocks of digital data (each sample may represent one or more data bits, and in some embodiments, may be complex-valued). In other embodiments, the input signal 105 is a parallel data signal that does not need to be parallelized, so the demultiplexer 305 need not be present.

An N'-FFT block 310 receives the N-sample blocks of digital data and pads each block with zeros, such as from a zero padding unit 315, to create N'-sample blocks of digital data. The number of padded zeros is preferably L−1 as described above. Block 310 applies an N'-point fast-Fourier transform (FFT) to each N'-bit block producing an N'-point real part block (I) and an N'-point imaginary part block (Q). The N'-point real part block (I) and the N'-point imaginary part block (Q) are provided to a complex multiplier 320 that multiplies each complex data point with a corresponding complex-valued filter coefficient. The filter coefficients implement a correction filter C(ω) 330 designed to compensate for channel dispersion effects. The N'-point products of the complex multiplication are output to an N'-point inverse FFT block 340.

The N'-point inverse FFT block 340 produces an N'-sample block of complex values, represented by in-phase output I and quadrature phase output Q. The overlap add unit 345 receives N'-sample blocks of data "overlaps" them by adding the last L−1 samples of each block with corresponding ones of the first L−1 samples of the next block, resulting in N-sample blocks of output data. The overlap add unit 345 produces an N-sample in-phase output block I and an N-sample quadrature-phase output block Q. The I and Q output blocks are separately serialized by a multiplexer 350 to form two serial streams.

The pre-equalized serial data streams are separately converted from digital to analog form by the digital-to-analog converters (DACs) 360A and 360B. The DACs 360A and 360B provide the analog I and Q signals to a two dimensional electrical-to-optical converter 370 that generates a pre-compensated optical signal.

The modulated light is launched into a fiber channel and travels over an uncompensated line to a receiver. In multi-span lines, the junction between spans may be bridged by optical amplifiers. In some embodiments, the junction is bridged only by optical amplifiers. Optical-to-electrical conversion is then performed after N amplified spans. In other embodiments, the junction between spans may be bridged by a transceiver. At the end of each fiber span, the received light is converted into electrical signal using a standard square-law optical-to-electrical converter (O/E) device, such as PIN photodiode-based receiver or and avalanche photodiode-(APD-) based receiver, which are known in the art. In both embodiments, the output of the O/E device is applied to a standard clock & data recovery device (CDR), which is known in the art. The CDR output produces the recovered signal, Y(t). Transceivers include a transmitter configured to re-modulate the data into an optical signal that traverses the next span. Each transmitter may include a frequency-domain pre-equalizer as described above.

Figure 4:
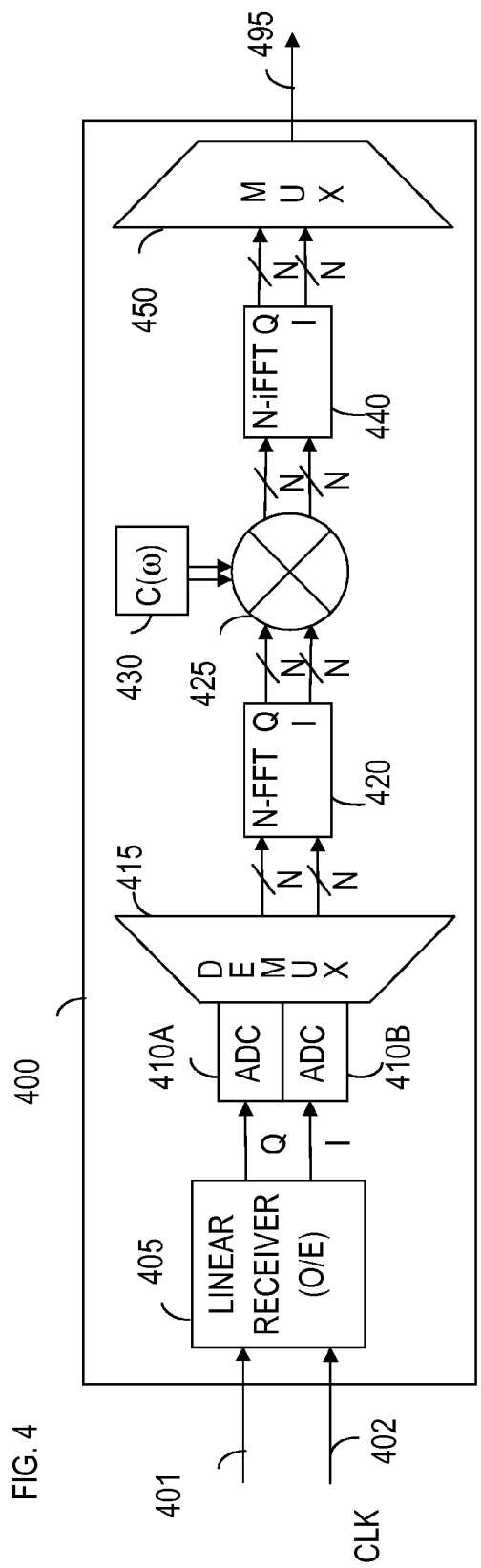
FIG. 4 is a block diagram of a receiver according to various embodiments of the present invention.

As an alternative to performing frequency domain pre-equalization in the transmitter, frequency domain post-equalization may be performed in the receiver. FIG. 4 shows an illustrative receiver implemented in accordance with some embodiments of the invention. The receiver 400 receives the transmitted data signal 401 with a linear (or linearized) receiver, which may be configured to operate as a coherent receiver based on a clock signal 402 If no clock signal is available from the transmitter, it may be reconstructed from the receive signal or derived in the digital domain. The in-phase and quadrature components of the electrical receive signal are digitized by analog-to-digital converters 410B and 410A, respectively. A demultiplexer 415 converts the digital in-phase and quadrature signals from serial to parallel blocks.

In switching from pre-equalization to post-equalization, it becomes desirable for the transmitter to add a "cyclic prefix" to each block of data. A cyclic prefix is a copy of the last L−1 samples in a data block prefixed to the beginning of the data block to create an N+L−1 sample data block, where L is the length of the channel response. N may be chosen to be significantly larger than L to minimize the overhead created by these prefixes. The effect of these channel prefixes is to cause the linear convolution of the channel response to mimic the effect of circular convolution in the digital domain. At the receiver, the demultiplexer discards the cyclic prefix from each data block, but the intersymbol interference created by the presence of the cyclic prefix remains in the N-sample blocks presented to the frequency domain transform block 420.

A N-point fast-Fourier transform (FFT) is applied at the N-FFT block 420 to each (complex-valued) N-sample block producing an N-point block of complex-valued frequency domain coefficients, as represented by a real part block (I) and an N-point imaginary part block (Q). A complex multiplier 425 multiplies each complex valued frequency domain coefficient by a corresponding complex-valued filter coefficient from a correction filter C(ω) 430. An inverse Fourier transform block 440 converts the resulting products into an complex-valued N-sample data block in the time domain. A multiplexer 450 serializes and interleaves the in-phase (I) and quadrature-phase components to reconstruct the transmitted data stream 495.

Figure 5:
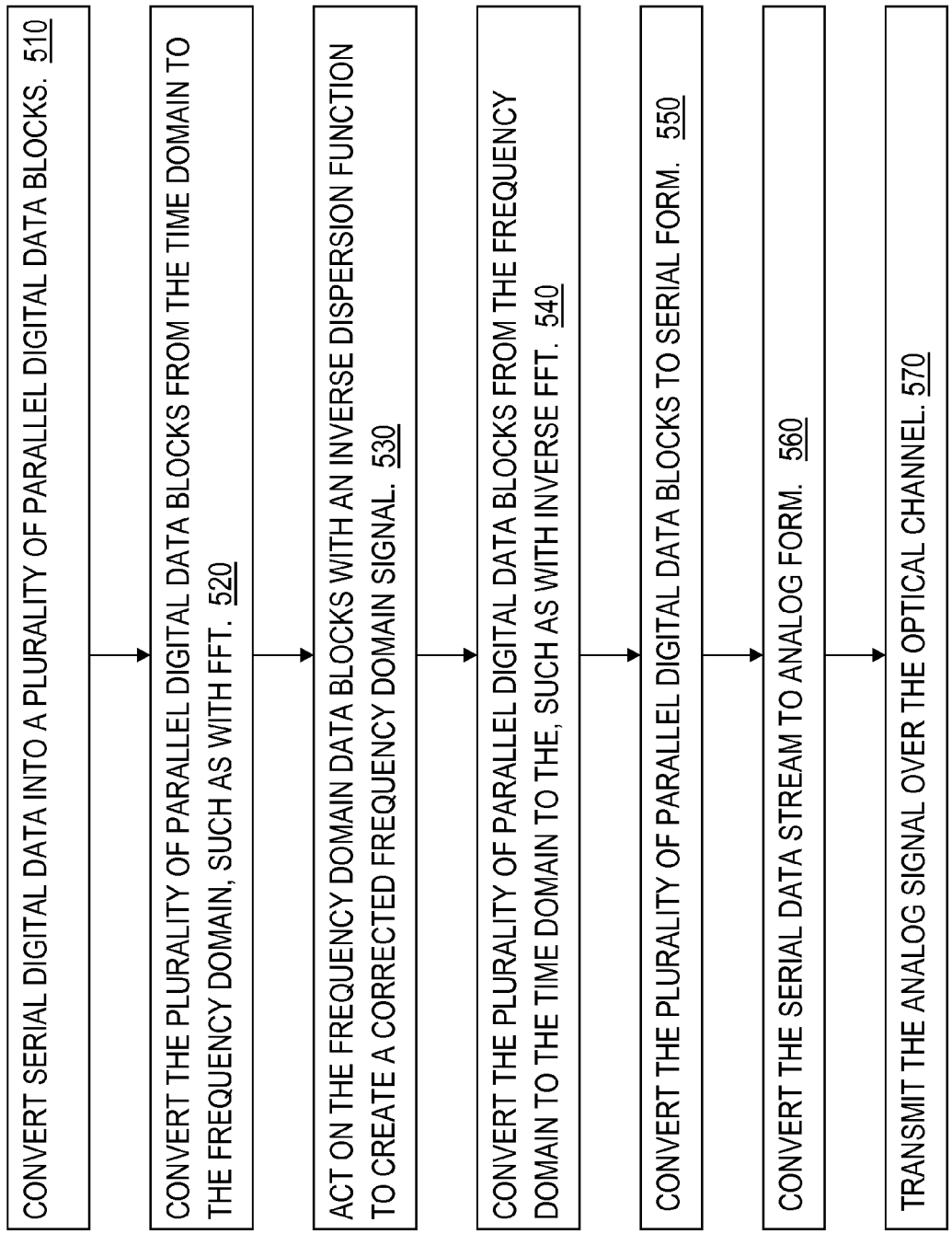
FIG. 5 is a flowchart of a method of frequency domain equalization according to various embodiments of the present invention.

FIG. 5 is a flowchart of an illustrative method for equalizing an optical channel in the frequency domain. In block 510, a transmitter converts serial digital data into a plurality of parallel digital blocks. The incoming data may already be parallel, in which case, the transmitter need only divide the data into the plurality of blocks. If the incoming data is analog, then the transmitter additionally converts the incoming analog data to digital form using a standard encoding.

In block 520, the transmitter transforms the plurality of parallel digital data blocks from the time domain to the frequency domain. In block 530, the transmitter applies an inverse dispersion filter to the frequency domain data blocks create a corrected frequency domain signal. The inverse dispersion filter will typically include the form given in equation (5) above. If the inverse dispersion filter is implemented to correct for more than linear dispersion, the form of the inverse dispersion function may be more complex than the right side of equation (5). In various embodiments, acting on the frequency domain data sets includes element-by-element multiplication by the inverse dispersion function. In some cases, the multiplication will involve both real and/or imaginary numbers (i.e., generally speaking, complex multiplication).

In block 540, the transmitter transforms the frequency-domain data blocks into the time domain. In block 550, the transmitter converts the plurality of parallel data blocks to one or more serial data streams. In some embodiments, the serial form is of two separate serial data streams, I and Q. In block 560, the transmitter converts the serial data stream(s) from digital form to analog form. Finally, in block 570, the transmitter optionally transmits the analog signal from block 560 over the optical channel by modulating an optical beam.

Numerous variations and modifications will become apparent to those skilled in the art once the above disclosure is fully appreciated. For example, the method shown in FIG. 5, when taken in conjunction with the preceding description, is understood to also disclose a post-equalization method used by a receiver in accordance with some embodiments of the present invention. The following claims are interpreted to embrace all such variations and modifications.

What is claimed is:

1. A method for countering dispersion caused by a fiber optic medium, the method comprising:
converting an optical beam into an electrical receive signal;
converting the electrical receive signal into time-domain data blocks, wherein said converting includes:
digitizing the receive signal to obtain a receive data stream; and
forming time-domain data blocks from the receive data stream, wherein said forming includes discarding cyclic prefixes to each time-domain data block;
transforming the time-domain data blocks into frequency-domain data blocks;
applying a dispersion compensation filter to each frequency-domain data block to produce a corrected frequency-domain data block, wherein the dispersion compensation filter provides a phase correction that is a nonlinear function of frequency;
transforming each corrected frequency-domain data block into a corrected time-domain data block; and
reconstructing a transmitted data stream from the corrected time-domain data blocks.

2. The method of claim 1, wherein the dispersion compensation filter is expressible with a frequency dependence in the form of $\exp(-j\ \beta_2\omega^2 L/2)$, where $\exp(\ )$ is the exponential function, j is the square root of $(-1)$, $\beta_2$ is a group velocity dispersion parameter, $\omega$ is frequency, and L is an effective length of a fiber channel that carries said optical beam.

3. An optical receiver that comprises:
a linear or linearized optical-to-electrical converter that converts a received optical signal into a received electrical signal;
an analog to digital converter that converts the received electrical signal into a received data stream;
a serial-to-parallel converter that forms time-domain data blocks from the received data stream, wherein the serial-to-parallel converter discards a cyclic prefix for each time-domain data block;
a frequency transformer that transforms the time-domain data blocks into frequency-domain data blocks;
a multiplier that applies a compensation filter to the frequency-domain data blocks to produce compensated frequency-domain data blocks, wherein the compensation filter provides a phase correction that is a nonlinear function of frequency;
an inverse frequency transformer that transforms the compensated frequency-domain data blocks into compensated time-domain data blocks; and
a decoder that reconstructs a transmit data stream from the compensated time-domain data blocks.

4. The optical receiver of claim 3, wherein the compensation filter compensates for optical dispersion effects of an optical channel.

5. The optical receiver of claim 3, wherein the compensation filter is expressible with a frequency dependence in the form of $\exp(-j\ \beta_2\omega^2 L/2)$, where $\exp(\ )$ is the exponential function, j is the square root of $(-1)$, $\beta_2$ is a group velocity dispersion parameter, $\omega$ is frequency, and L is an effective length of a fiber channel that carries said optical beam.

6. The optical receiver of claim 3, wherein the inverse frequency transformer further adds overlapped portions of the compensated time-domain data blocks.

7. The method of claim 1, wherein said reconstructing includes adding overlapped portions of the compensated time-domain data blocks.

* * * * *